Figure 1:
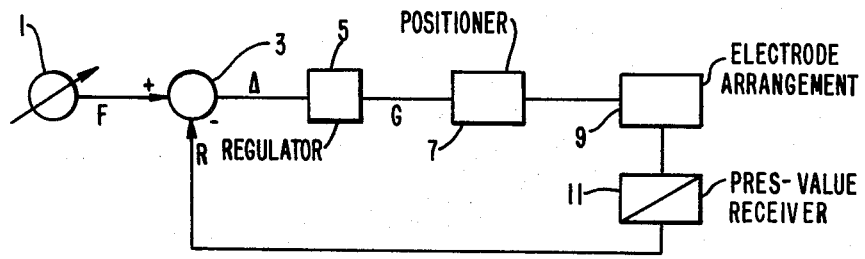

United States Patent [19]

Rossell

[11] Patent Number: 4,484,056
[45] Date of Patent: Nov. 20, 1984

[54] METHOD AND APPARATUS FOR CONVEYING AT LEAST ONE WELDING OR SOLDERING ELECTRODE TO A WORK PIECE

[75] Inventor: Jame Rossell, Lausanne, Switzerland
[73] Assignee: Rossell Electronique SA, Switzerland
[21] Appl. No.: 339,439
[22] PCT Filed: May 11, 1981
[86] PCT No.: PCT/CH81/00049
§ 371 Date: Jan. 8, 1982
§ 102(e) Date: Jan. 8, 1982
[87] PCT Pub. No.: WO81/03297
PCT Pub. Date: Nov. 26, 1981

[30] Foreign Application Priority Data
May 14, 1980 [DE] Fed. Rep. of Germany ....... 3018384

[51] Int. Cl.³ .............................................. B23K 11/00
[52] U.S. Cl. ................................ 219/86.51; 219/117.1; 228/179
[58] Field of Search .................. 219/86.51, 86.41, 110, 219/108, 109, 117.1; 228/179

[56] References Cited
U.S. PATENT DOCUMENTS
2,472,368 6/1949 Cox et al. ........................... 219/86.51

3,449,541 6/1969 Wilcox et al. ........................ 219/110
3,514,569 5/1970 Pfaelzer et al. ...................... 219/110
3,553,420 1/1971 Shearer, Jr. et al. ................ 219/110
3,727,822 4/1973 Umbaugh ............................. 219/110
4,340,166 7/1982 Bilane et al. ......................... 228/179

Primary Examiner—Clifford C. Shaw
Attorney, Agent, or Firm—Lerner, David, Littenberg, Krumholz & Mentlik

[57] ABSTRACT

It is proposed that the supply movement of electrodes, especially micro-welding or micro-soldering electrodes takes place in a controlled fashion. For this purpose, PRES-value receivers (65, 67) are provided, which change the PRES-value of a relatively known value for the action of the electrode with regard to the work piece, such as the geometric position, if need be additionally the supply pressure, on its output side into an electrical signal, whereby the electrode position is already detected before contacting the work piece. The working connection between positioner and a supply element (50) for the electrode (59) is therefore preferably realized by an electric motor (42), a gear wheel type threaded connecting rod (44, 46). As PRES-value receiver preferably a potentiometer (67) of known displacement/force characteristic is used which takes up a relative movement between electrode (59) and the reference system.

12 Claims, 15 Drawing Figures

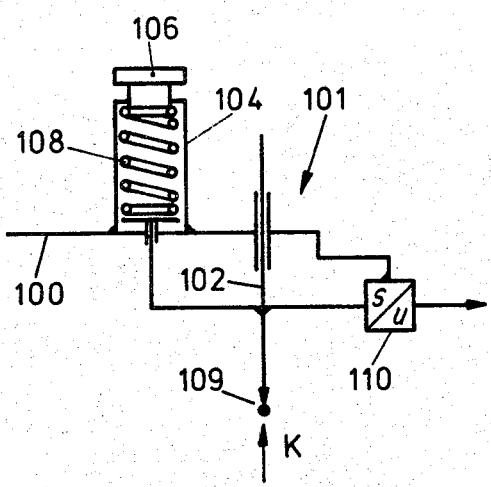
FIG. 6
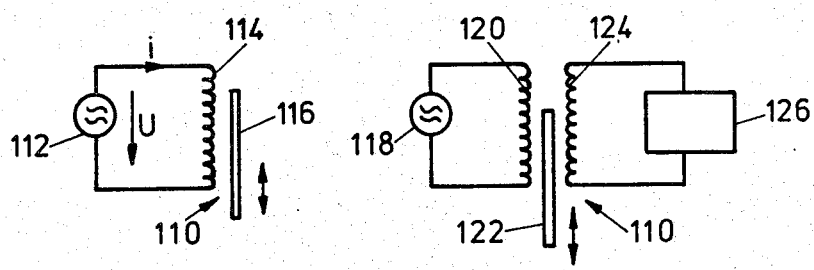
FIG. 6a
FIG. 6b
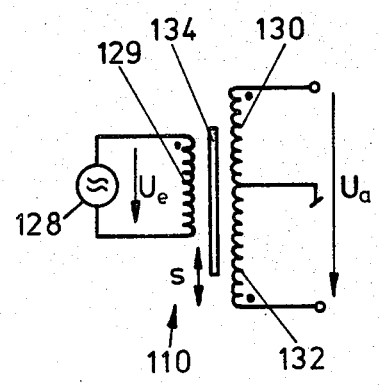
FIG. 6c

METHOD AND APPARATUS FOR CONVEYING AT LEAST ONE WELDING OR SOLDERING ELECTRODE TO A WORK PIECE

The invention concerns a method for the position control of at least one welding or soldering electrode whereby a signal is supplied as a value corresponding to one electrode position and also a signal is supplied corresponding to the theoretical position, a supply mechanism for the execution of the method, with a supply element to be displaced for the electrode, and also a power unit which is connected to the supply element which is connected, at least with a position measuring means on the input, with an electrode, and supplies an electrical signal on its output with a preset value control unit for the control of at least one positioning preset value signal; further, a comparison unit connected on its input with the receiving output and the control unit output; on the output with a control input connected to the power unit, and also the use of the method for micro-spot welding and/or micro-aperture welding and/or micro-soldering, and further, the use of the supply mechanism for the supply of micro-spot welding electrodes and/or micro-aperture welding electrodes and/or micro-soldering electrodes, such as for Re-Flow soldering.

PRESENT STATE OF TECHNOLOGY

From CH-PS No. 448 308 a device is known in which the position of a welding electrode is detected with the aid of a potentiometer. After applying the welding current, the movement of the electrode where the welding current is applied, is registered and compared with a preset value such that when this preset value signal is obtained, i.e. after the resulting movement of the electrode with welding current, the latter can be brought back.

A method is known from DE-OS No. 23 32 792 whereby the electrical transfer resistance between two welding electrodes and the work piece is detected as and indication that the electrode has attained the working position, such that, by attaining a predetermined minimal resistance value, the welding current can be applied. The movement of the electrode cannot be influenced in any of these known methods before reaching the work piece in a controlled fashion.

REPRESENTATION OF THE INVENTION

The task of the present invention is to ensure contact of the work piece with the least possible mechanical impulse change, even with rapid supply of an electrode against the work piece. This is achieved with a method of the above-mentioned type, by measuring the electrode position in a definite fashion and returning it as control value upon reaching a distance between the electrode and work piece.

Consequently the influence of a power element is already possible before the mechanical contact between the electrode and the work piece, so that the latter is achieved very slowly in the approach phase.

In order to consider the work piece tolerance, it is further proposed that before reaching a second smaller approach distance, the electrode position is measured and fed back as a control value and from then this signal controls the pressure between electrodes and work piece.

The supply mechanism for the execution of the method has a displaceable supply element for the electrode and also a power element which is coupled with the supply element and additionally at least a position measuring means, which is connected on its input with the electrode and supplies an electrical signal on its output; further, a preset value control unit to give at least a positioning preset value signal, and a comparison unit which is connected on the input with the receiver output and the control value unit output and on its output with a control input of the power element, and characterizes itself by the fact that the position measuring means output supplies an electrical signal that will change in a definite fashion with the electrode position, at least after reaching an approach distance between the work piece and electrode.

With such a supply mechanism it is ensured that the electrode position is observed as a control value already before reaching the work piece, as this is necessary for the inventive method.

Usually work pieces can have relatively large sample deviations in regard to their geometric measurements, so that a certain unsureness can exist in regard to the definition of the approach distance. In order to solve this problem it is further proposed to provide an additional receiver which receives the supply pressure between the electrode and the work piece. The receiver first mentioned is preferably constructed as a potentiometer which is coupled mechanically with the supply element.

When the comparison unit has connected to it a detection medium for the detection of a control differential minimum value, and the switching elements are controlled through the detection mediums, which actuate the return movement for the supply element, it is achieved that, after detection of the working position and detection of the corresponding work with the difference between the actual position of the electrode and its theoretical position, the completion of the work can be controlled and the electrode or the supply element can be retracted. Therefore through this switching element the supply and the return of the electrode can be cyclically and automatically controlled. When the return into the rest position also has to be controlled it is proposed to supply a second preset value signal to the control unit.

When the position measuring means supplies a signal uniquely defining the electrode position only after an approach distance with regard to the work piece, whereby this distance is smaller than the one between electrode and work piece in the rest position, it is proposed to connect the supply element for the supply through a first position measuring means, and for the return two a second position measuring means coupled with the comparison unit.

Especially for the automatic supply and return of the electrode, it is proposed that the switching elements encompass at least a controllable time delay switch arranged between the detection mediums and the switching elements, with which it can be controlled as long as the electrodes stay on the one hand in the rest position and/or on the other hand in the working position.

Preferably, the supply mechanism is constructed such that at least the power and supply element with its coupling is constructed together as a first mechanical construction unit, at least the control unit and the comparison unit as a second electronic unit, and that mechanical guides and electrical couplings are provided in order to connect the units in a modular fashion. Therefore, it is possible to provide the mechanical installation, depending on the requirements, with different controls whereby these two modules can be put together respectively without great expense. The modular construction of the supply mechanism is preferably expanded by the fact that the first and/or second building unit has mechanical guides or supports and electrical connections for additional equipment such as microscopes, light sources, crossbar table, and an opposing electrode.

In order to optimize the manner in which the electrode makes contact with the work piece, a regulator is preferably provided corresponding to the requirements as a P-PI-or PID regulator.

The supply mechanisms for the electrodes often have protruding supply elements on which the electrodes are mounted in order to ensure the accessibility to the work piece with regard to the power element, control units of the device, etc. In order to adjust the supply pressure between the electrode and a work piece, possibly immediately and without influence by spring parts and especially through the protruding supply elements with the additionally proposed position measuring means for this, it is proposed that this is arranged between the supply element and a fixed electrode holder connected with the electrode. Consequently a bending of the supply element due to the pressure does not influence the pressure receiver.

SHORT DESCRIPTION OF THE DRAWINGS

The invention is described through examples with the aid of figures.

Shown are:

FIG. 1 a signal flow diagram of the supply control

Figure 2A:
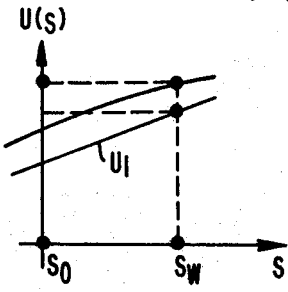
Figure 2B:
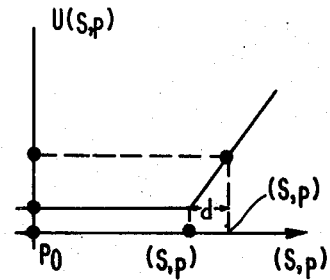
Figure 3:
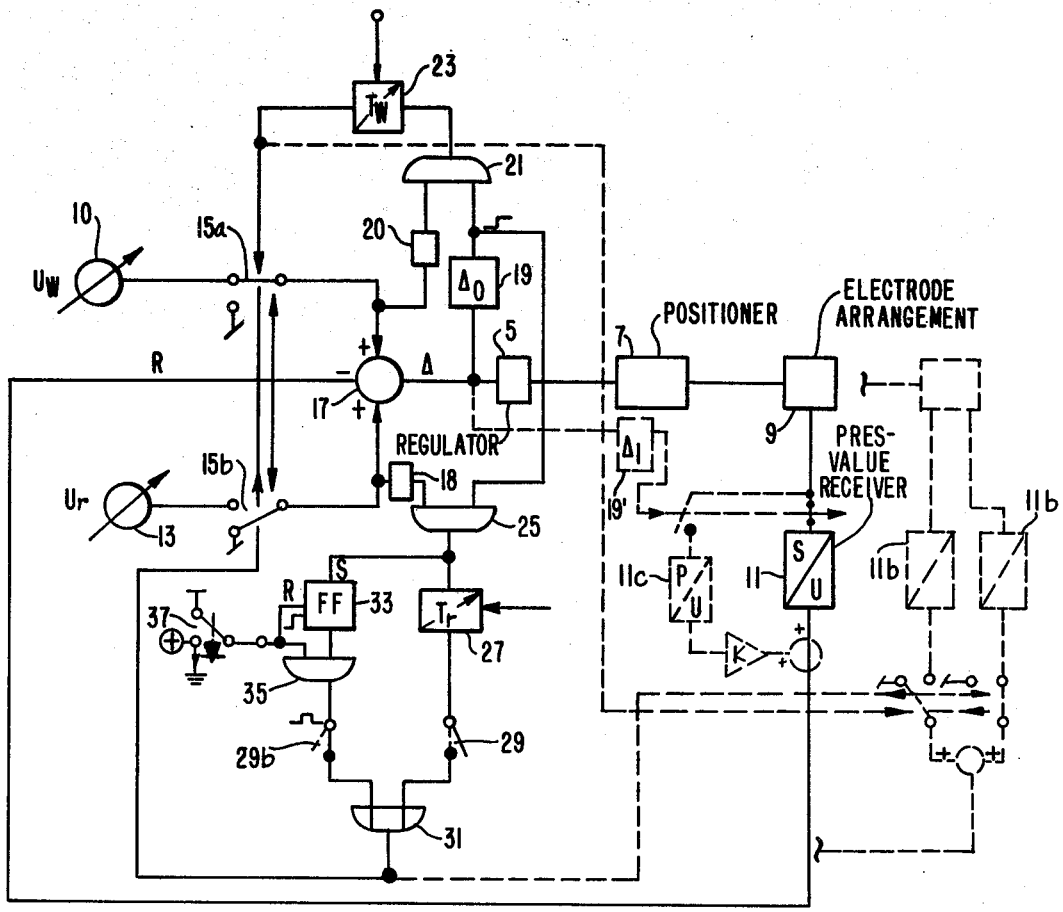
Figure 4:
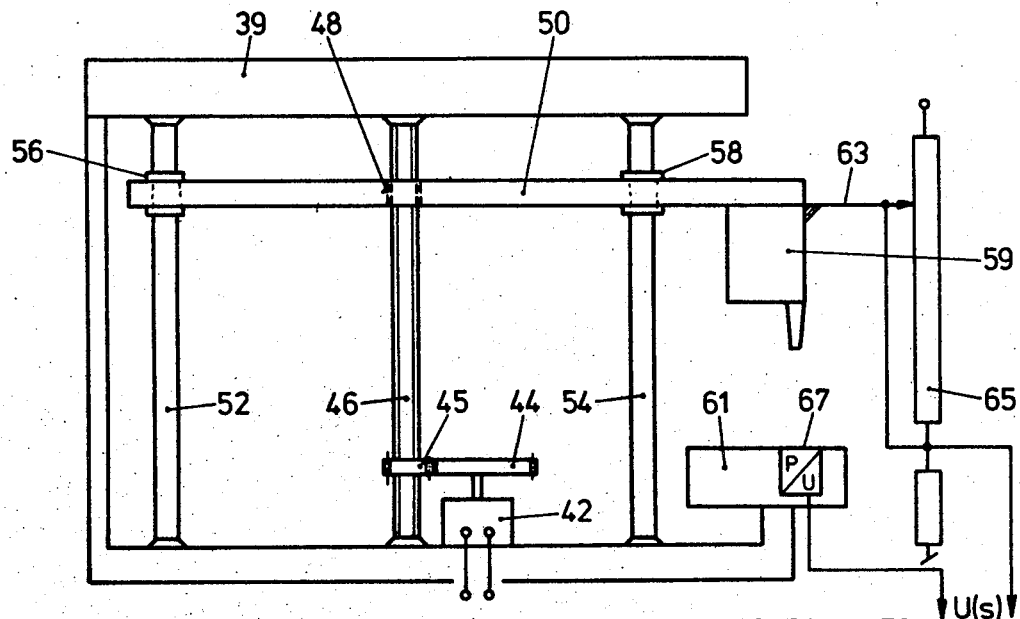
Figure 5:
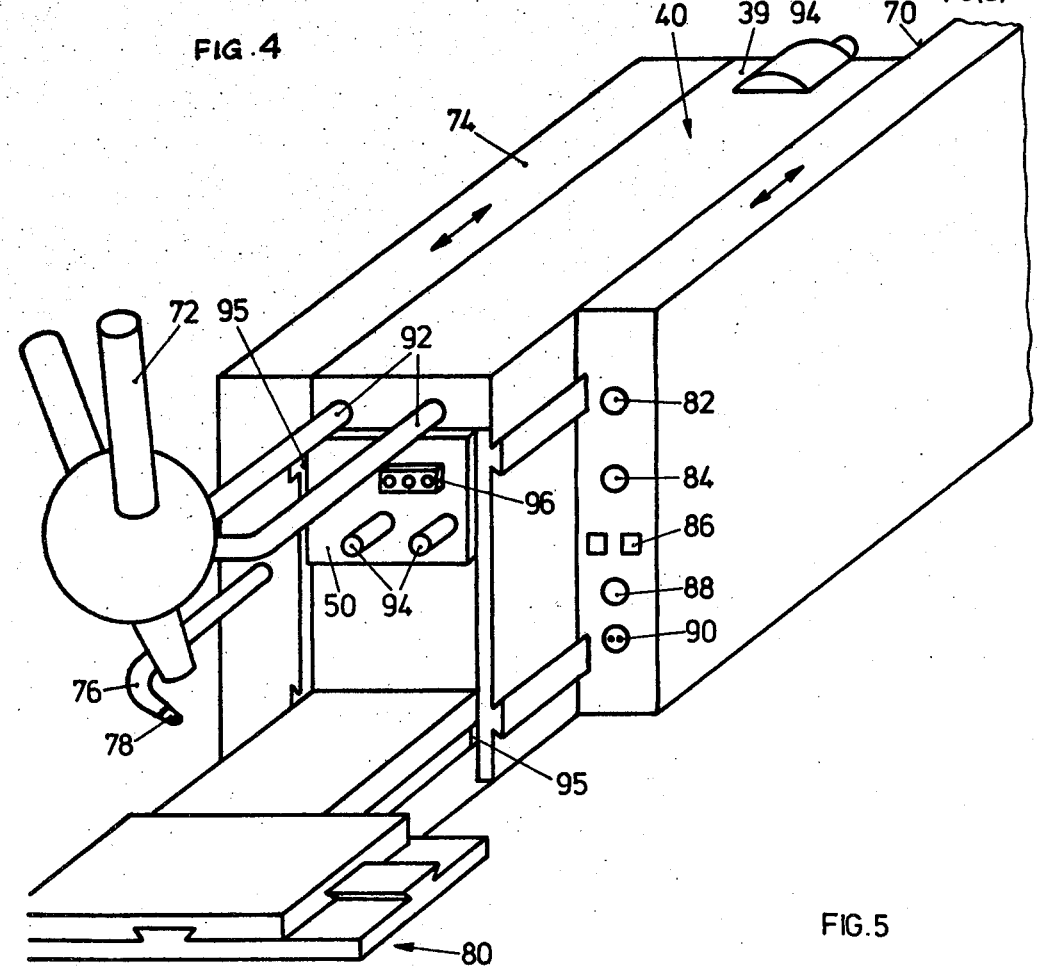
Figure 7:
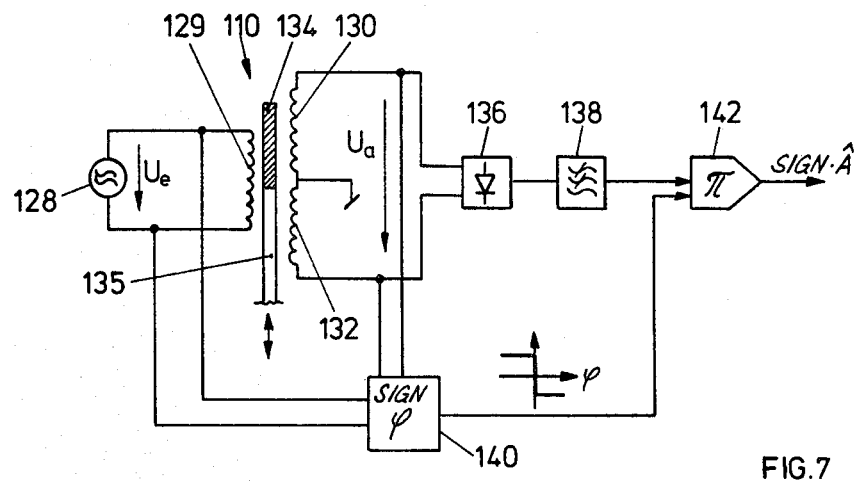
Figures 8A, 8B:
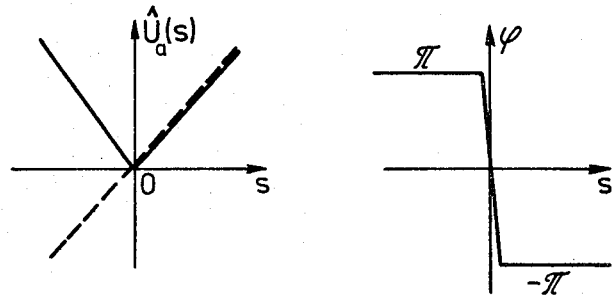
Figure 9:
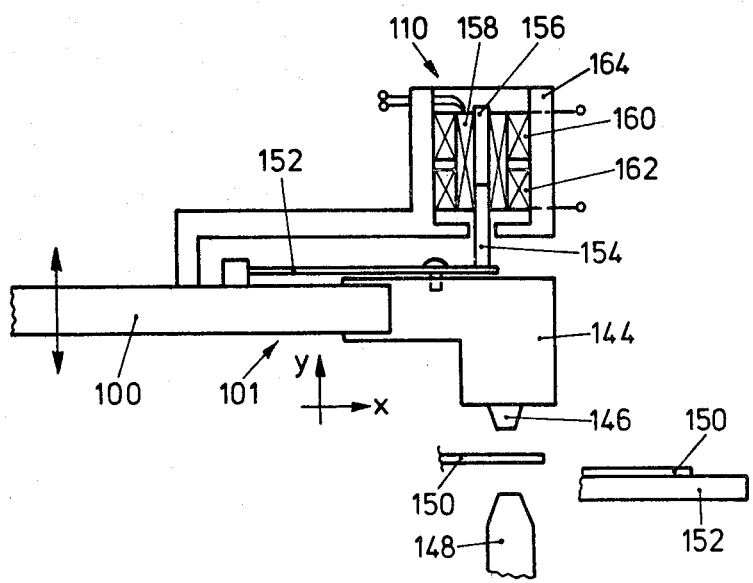
Figure 10:
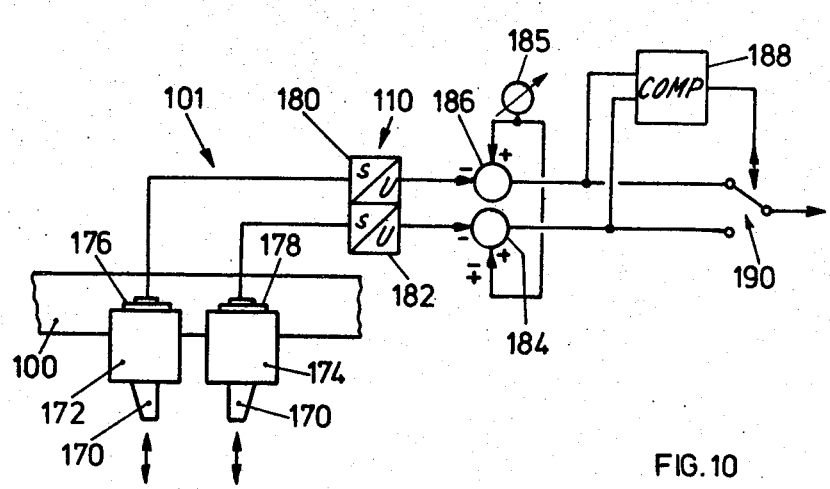

FIG. 2a a qualitative transfer characteristic of a position measuring means, as used in the control of FIG. 1, for the supply of an output signal continuously changing with the position of the electrode, FIG. 2b a qualitative transfer characteristic of another usable position measuring means in the control according to FIG. 1, whereby the output signal changes continuously after reaching a preset value of the input signal, FIG. 3 a functional block diagram of the control according to FIG. 1, FIG. 4 a schematic representation of the mechanical construction of the regulator, position measuring means, and supply element for the electrode, FIG. 5 a perspective view of a supply mechanism constructed in a modular fashion with additionally attachable accessory equipment, FIG. 6 a schematic representation of a position measuring means for the electrode supply pressure, FIG. 6a a first switching arrangement for the displacement position measuring means of the receiver according to FIG. 6, FIG. 6b a second switching arrangement for the displacement position measuring means of the receiver according to FIG. 6, FIG. 6c a third preferred switching arrangement for the position measuring means used in FIG. 6, FIG. 7 a functional block diagram for the evaluation circuit on a displacement receiver according to FIG. 6c, FIG. 8a and 8b the amplitude or phase shift of the position measuring means according to FIG. 6c, FIG. 9 a schematic representation of the transducer construction according to FIG. 6 with a displacement receiver according to FIG. 6c, FIG. 10 a functional block diagram of a position measuring means and comparison unit for aperture welding electrodes which are independently supported.

DESCRIPTION OF EACH FIGURE

Shown in FIG. 1 is the basic construction of a control circuit for the positioning of an electrode into a working position on a work piece. Such electrodes basically pertain to welding electrodes for metal or plastic welding, but especially for micro-welding techniques, bonding, and micro-soldering techniques. A preset value F is preset with a control unit 1. This value is compared on a comparison unit 3 with a control value R. The control differential Δ, appearing on the output of the comparison unit 3, is supplied through a regulator 5, a positioning value G to the electrode positioner 7, which powers the electrode arrangement 9 for the supply and return movement. The electrode arrangement 9 is connected with a position measuring means 11 which supplies on its output a value, the control value R, which is compatible with the guide value F. As has to be yet described, the position measuring means is preferably a mechanical/electrical transducer. By changing of the guide value F with the aid of the predetermining unit 1, the electrode arrangement 9 will primarily be adjusted into the contact position, and if need be the working position, in regard to a work piece and secondarily to its return position. The position measuring means 11 primarily must satisfy the requirement that it supplies a unique signal defining the condition that the electrode arrangement 9 is already in a contact position.

As shown in FIG. 2a and 2b, two basic position measuring means types can be seen and distinguished, whereby here one can be designated as continuous and the other as discontinuous. When the position measuring means is continuous it will supply an electrical signal U(s) as a function of the electrode approach s onto the work piece, which changes continuously and linearly when leaving the rest position $s_o$, in the special case $U_1$, until contact in the working position, is reached corresponding to $s_w$. Such a position measuring means is constructed for example by a displacement receiver acting over the complete lifting distance $s_o - s_w$.

If the transducer is "discontinuous" according to FIG. 2b its output signal changes only when the electrode arrangement reaches an approach distance d, which does not have to be known, in regard to its contact position. While such a position measuring means can also be a displacement measuring means, which only acts at $s_{actual} - s_{nom} < d$, or a support pressure measuring means, in each case such a discontinuous means starts to function only after contact, and is therefore not suitable alone for the regulation of the contact. The pressure starts to change only when the electrode is in contact with the work piece. FIG. 2 designates the beginning of the action $(s,p)_w$ of such a "discontinuous" transducer, and $(s,p)_w$ the attainment of the contact or working position. Only by the detection of the distance s can one make a definite statement on the electrode position before contact of the electrode and work piece. The pressure p can be additionally detected in order to also regulate the attainment of the working position after the "soft" regulated contact.

Shown in FIG. 3 is a functional block diagram of the generally described control circuit. Due to simplification, the contact and working position are shown as being the same. With a primary control unit 10, the preset value $U_w$ is given for the contact or working position with a second unit 13, the preset value $U_r$ for the return position. The output signal of the control unit 10 is supplied to a comparison unit 17 through a controllable switching element 15 with a switching circuit 15a, also the output signal of the control unit 13 through circuit 15b. The comparison unit 17, on its output, acts on the electrode arrangement 9 through the regulator 5 and the position of the electrode positioner 7 which, as already described, influences the feed-back control value R on the comparison unit 17 through receiver 11. The output signal of the comparison unit 17 is supplied further to a detection unit 19, for example a comparator, which controls the switching element 15 through an AND unit 21 and a time delay unit 23. The output signal of the detection unit 19 is supplied to an OR-unit 31 through an additional AND-unit 25 and an additional time delay unit 27 and also a selector switch 29a.

The output of the AND-unit 25 is further supplied to the second input of the OR-unit 31 through a bi-stable element 33, an AND-unit 35 and also the selector switch 29b, whose output also controls the switching element 15. A manually operated start button 37 acts on one hand on the bi-stable element 33, on the other hand on the second input of the AND-unit 35. As can be further seen, the selector switch 29 acts to choose between automatic operation or manually controlled operation, whereby in the first operation the electrode arrangement is cyclically powered foreward and retracted.

It is assumed that, for the before-mentioned interruption of the automatic operation, the selector switch 29 is switched to the shown position. During the before-mentioned return movement the switching, the circuit 15b of the switching element 15 was closed and the connection 15a was opened. The detection unit 19 with the switching element 15 so arranged detects the attainment of a minimal control difference on the output of the comparison unit 17, $\Delta_o$, which is for example the zero value. For example, the output signal of the detection unit 19 goes to a logic signal value '1'. On the second input of the AND-unit 25 a logic '1' signal will also be supplied through a comparator 18 through the closed switching circuit 15b so that before reaching the return position, the bi-stable element 33, for example a Flip-Flop, is set. The AND-unit 35 supplies an 'O' signal when the button 37 is open. When the manual control button 37 is now closed the bi-stable element 33 is reset on the one hand, but beforehand, on the output of the AND-unit 35, a pulse signal appears whereby, through an OR-unit 31, the switching circuit 15b is opened and the switching circuit 15a is closed. Thereby the set preset value $U_w$ for the contact or working position of the electrode arrangement 9 is active with the control unit 10. The electrode arrangement is brought into this position by the control circuit 5, 7, 9, 11. As soon as this is reached, the detection unit 19 again detects the minimal controlled differential and actuates now, with the aid of the presently active preset value $U_w$, the comparator 20 and unit 21, the time delay unit 23 for the contact or working position which opens the switching circuit 15a and closes 15b after a predetermined time delay $T_w$. Consequently the preset value $U_r$ for the return position is again active. After time $T_w$, i.e. after attainment of the contact or working position, the electrode arrangement 9 is brought back to its rest position.

Consequently the configuration previously described is again achieved, switch or button 37 open, selector switch 29 is shown position and this arrangement waits for a new actuation of button 37. When the selector switch 29 is switched to the automatic operation (shown by dotted lines) after the actuation of the first electrode supply movement, the attainment of the return position causes a delay with the aid of the time delay unit 27 by $T_r$, to open the switching circuit 15b and to again close 15a. Therefore the result is an automatic constant supply and return of the electrode arrangement 9. The bi-stable element 33 ensures that the manually operated switch 37 is only active when the return position is actually attained. When the receiver 11 according to FIG. 2a is a "continuous" receiver it poses no additional problems for the regulation of the return and the contact or working position. But, as shown by dotted lines, when a discontinuous position measuring means 11a is used for the detection of these positions, the same cannot, as can be seen from the characteristic curve of FIG. 2b, be used for the detection of the return position because it does not supply a unique signal which defines this position, for example $P_o$. In this case it is required that a second position measuring means 11b be provided for this return movement, either continuous or discontinuous, which supplies, upon attaining the return position, an output signal defining this position. This second position measuring means 11b can now be, for example, an approach switch, in other words a two-input position measuring means. The effectiveness of the two transducers 11a and 11b, shown by dotted lines, are controlled in the same fashion as the two preset values $U_w$ and $U_r$. The described control can be built with readily available logic whereby as already mentioned, the conversion of the acting preset values $U_r$ or $U_w$ as the additional analogue values $\Delta$ into a logic signal to the input of the units 25 and 21 can be achieved with the aid of the comparators 18, 19, 20. When differentiated between contact and working position and $U_w$ corresponds to the working position, the pressure measuring means 11c is switched as a position measuring means with the aid of comparators 19', as shown by dotted lines, when the control difference $\Delta$ reaches a predetermined value $\Delta$, on the output of the comparison unit 17.

Shown in FIG. 4 is the mechanics of the drive mechanism for the electrode arrangement and also a continuous element receiver. In the housing 39 is an electric motor 42 functioning as a positioner, according to FIG. 1 and 3 and positioner 7, which acts with a gear wheel 44, if need be through a gear unit (not shown) on a gear wheel 45, cooperating with a threaded rod 46, which is supported on both sides in a housing 39. The threaded rod 46 is inserted with its threads into a threaded hole 48 of a bridge piece 50. The bridge piece 50 is movably supported on at least two guide anchors 52 and 54, by means of guide sleeves 56 and 58, whereby the anchors 52 and 54 are connected on both sides with the housing 39. By the electric motor 42, the gear wheel 44, and the threaded rod 56, which is in contact with the threaded hole 48 of the bridge piece 50, the latter together with the schematically shown electrode arrangement 59, for example in regard to a supporting table 61, is moved up and down as for aperture welding and soldering or for spot welding relative to an opposing electrode. By the easily realizable precise guiding of the bridge on the anchors 52 and 54 and also a precision winding on the threaded rod 46 and threaded hole 48, an extremely precise positioning of the bridge piece 50 is possible, and therefore of the electrode arrangement 59, as a function of the turning angle of the gear wheels 44 and 45. An extremely simple "continuous" receiver is realized by the fact that the bridge piece 50 or, if need be the permanently mounted, preferably exchangeable, electrode arrangement 59, is mechanically connected with the tap 63 of a potentiometer 65. As shown, switched into the potential divider, the detected potential part U(s) varies in function with the bridge position. The potentiometer 65 can be a linear or non-linear potentiometer. A discontinuous transducer according to FIG. 2b, for instance a pressure/potential transducer 67 with a piezoelectric element, as an addition to the transducer 65, can be mounted on the table 61 if need be, on the opposing electrode or on the electrode arrangement 59 itself. The electric motor 42 for example is controlled by applying the correct DC voltage corresponding to the control difference.

Shown in FIG. 5 is a perspective of a structural unit 40 incorporating the housing 39 according to FIG. 4, whereby guides 95 and electrical connections (not shown) are provided on it in order to fasten in a modular fashion on the one hand the electronic controls in unit 70 and on the other hand accessory equipment such as a microscope 72, a light source 74, with a light conductor 76 and an optic 78 including a crossbar table 80, all mounted on the unit 40. The electric unit 70 has, for an example, an adjusting knob 82 for the controlled return preset value, an adjusting knob 84 for the controlled operational position preset value, lighting indicators 46 for selecting either automatic or manual operation, a switch 88 to choose the automatic or manual operation, and a connection 90 for remote control elements in the manual operation, as for example a foot switch. The microscope 72 is guided in guide anchors 92 and can be positioned by means of a set screw 94. On the bridge piece 50 support elements are provided for example posts 94, for exchangeable electrode arrangements with electrical plug-in connections 96, shown schematically. Also the crossbar table 80 can be removed from the mechanical unit 40, acting as central support unit, for example to provide instead for spot welding an opposing electrode. This modular construction is the result of a highly compact flexible building block system which can be adapted to the requirements whereby the electromechanical construction of the unit 40 as shown in FIG. 4 delivers on the one hand an extremely inexpensive, but on the other hand a very precise, guided supply mechanism.

Shown with the aid of FIG. 4 is an extremely simple "continuous" position measuring means. While such "continuous" displacement position measuring means have the advantage of simplicity they do have the disadvantage that they strongly define the contact or work precision as a relative position with regard to the work piece support of the opposing electrode. However, it is known that especially in micro-welding techniques or micro-soldering techniques the geometry of the sample size of the work piece often cannot be ignored, and that it is often better to define the working position with regard to a working parameter of the chosen technique, for example the support pressure of the electrodes on the work piece.

Piezo-electric pressure transducers are known but are relatively expensive, along with the amplifiers to be used with them. Therefore it is hereinafter proposed that the pressure measurement to be taken, in addition to the displacement measurement, also takes place through a displacement measurement and an element should be provided with a known displacement/force characteristic. Thereby it should be ensured that a bending of an electrode holder 100 does not go into the before-mentioned displacement measurement.

Schematically shown in FIG. 6 is such a receiver 101. On the holder 100, for example on the bridge piece 50, as a reference system, the electrode mounting support 102 with electrode 109 is movably supported. The electrode mounting support 102 acts on a pressure spring element 108 with a known, if need be, adjustable displacement/force characteristic which can be adjusted and/or exchanged with regard to a holder 100, for example, in a sleeve 104 by means of a set screw 106. The displacement of the electrode arrangement 102 with regard to the reference systems is measured with the aid of a displacement receiver 110 whereby from the known characteristic of the spring element 108 and the displaced distance of the electrode arrangement 102 with regard to the holder 100 the force K momentarily acting on the electrode 109, by considering its geometry, the support pressure p can be determined. Consequently by knowing the spring characteristic an electric signal as a preset value an output can be supplied which corresponds to the output signal of the displacement receiver 110 upon obtaining the working position which is measured by the preset working pressure. The displacement receiver 110 has to be capable of a large resolution, i.e. precision, since, for example, by the observation of FIG. 2b, it can be seen that it has to be able to act on extremely small displacement sections.

Shown in FIG. 6a to 6c are three variations of an extremely precise displacement receiver 100, the design according to 6c being preferred. According to FIG. 6a a switching signal generator 112 is switched to an inductor 114. While the inductor 114 is fixed with regard to the holder 100, for example on the bridge portion 50 according to FIG. 4, or on a solidly mounted electrode head, the core 116 is movable up and down with the eletrode 109 according to FIG. 6. Through different insertion distances of the core 116 into the inductor 114, its value will be changed so that the appearing impedance of the inductor and core can be evaluated as a signal corresponding to this displacement.

In a second variation, a switching signal generator 118 is provided, which feeds the primary side 120 of a transformer. The core 122 movably coupled with the electrode 109 according to FIG. 6 again changes the transfer relationship of the transformer from the primary winding 120 to the secondary winding 124, so that its secondary signal can be evaluated as a displacement indicator in a schematically shown evaluation unit 126.

However, preferably, a differential transformer according to FIG. 6c is used, with a switching signal generator 128 which supplies the primary side and two secondary windings 130 and 132 which are connected in a differential circuit. Again a core 134 is movably coupled with an electrode 109, the latter moving up and down.

Shown in FIG. 7 is a functional block diagram of the evaluation electronics for the differential transformer-displacement receiver according to FIG. 6c. The output potential $U_a$ detected on the two secondary windings, is a function of the displacement of the ferrite core 134, mounted on an anchor 135, displaced from the symmetrical position O, the amplitude curve $\hat{U}_a$ (s) shown in FIG. 8a. Shown in FIG. 8b is the phase shift ρ of the output signal $U_a(s)$ with regard to the primary signal $U_e$ according to FIG. 6c. According to FIG. 7 the output signal of the differential transformer $U_a(s)$ is rectified in a rectifier unit 136 and then is supplied to a low pass filter 138 on the output of which appears an amplitude proportional signal. The phase information, but only in regard to its sense, is formed in a phase detection unit 140 to which the signal $U_e$ of the primary side and the output side $U_a(s)$ is supplied. The unit 140 only has to detect whether $U_a(s)$ with regard to $U_e$ is ahead or behind, and supplies on its output, as pointed out with the schematic characteristic curve, a two position signal. The phase or sense signal and the amplitude signal are multiplied with each other in a multiplier 142 so that on its output appears the amplitude signal with the correct polarity corresponding to the phase direction drawn in FIG. 8a, dotted characteristic curves. This output signal is used as control value in the control circuit according to FIG. 1, 3 whereby the preset value is chosen by considering the known spring characteristic of the spring element 108 of FIG. 6.

Shown in FIG. 9 is the mechanical construction of this force/potential transducer. On the holder 100, for example on the bridge piece 50 of FIG. 4 and 5, is an electrode head 144 with a spot welding or aperture welding or soldering electrode 146 which, corresponding to the chosen technique, acts by spot welding on an opposing electrode 148 and the work piece 150 placed between it, or for soldering or aperture welding, acts only on the work piece 150 placed on the table 152. The electrode head 144 is movably supported with regard to the mounting support 100, for example by means of leaf springs 152. It has an anchor 154 which moves the core, for example a ferrite core 156, in the transformer with the primary winding 158 and the two differential secondary windings 160 and 162. The transformer with the mentioned windings is fixed with regard to the mounting support 100, for example supported in a housing 164. Even when the electrode head 144 is not moved exactly linearly in direction Y, as soon as the electrodes 146 make contact with the work piece, but also have a moving component in the x-direction, the latter is for most applications and the resulting displacement, negligible. The described transformer type displacement measuring apparatus can be mounted on practically all conventional mounting supports or electrode heads 144.

As is known, aperture electrodes can be moved independently from each other with regard to their holder, for the accomodation of the irregularity of a work piece.

FIG. 10 shows schematically two aperture electrodes 170 in mounting supports 172 and 174, which are arranged, for example, according to FIG. 9 by means of leaf springs 176 and 178 on a holder 100 for example, on a bridge part 50, as previously described. Since both aperture electrodes 170 can be moved independently from each other one has to differentiate, for example, by the application of the receiving technique schematically shown with the aid of FIG. 6 which position of the two electrodes can be used as a control value. With equal spring elements 176 and 178, the greater pressure acts on that aperture electrode 170 which executes the larger displacement. However, for welding, on the other hand, the weaker of the two contacts and therefore the smaller of the two pressures acting on the aperture electrodes 170 is the determining factor. As is shown now schematically in FIG. 10, both displacements or strokes of the aperture electrodes 170 are detected in measuring apparatus 180 or 182 where each of them, but not necessarily, can be constructed as is already described with the aid of FIG. 6. Each is supplied to a comparison unit 184 and 186, similar to the comparison units 3 of 17 or FIG. 1 and 3, which has additionally supplied to it, the same preset value F for comparison on the output; the result being two control differentials which are supplied to a comparator 188. The comparator unit 188 switches either one or the other of the two control differentials to the regulator as shown schematically with the switch 190. Therefore, with pressure measuring means it is ensured, with aperture welding, that the smaller operating pressure of the two aperture electrodes corresponds to the rated operating pressure, and it is taken into account that the other is larger than the working pressure. By the provision of pure displacement measuring means, for example 65 in FIG. 4, it could be preferable to regulate with the smaller control differential in order to avoid damaging the work piece.

With the aid of the described regulated positioning, usable for welding and soldering techniques for metal and plastics, especially for the micro-welding technique with aperture or spot welding electrodes, including the micro-soldering technique, a precise electrode positioning is achieved whereby the electromechanical construction is simple, inexpensive, and still extremely precise. Also, the different described position and pressure measuring means for the electrode positioning are relatively independent from the electrode head and electrodes used, so that relatively common electrode heads can be used.

I claim:

1. A method for conveying at least one welding or soldering electrode toward a workpiece comprising the steps of:
   presetting a rated position signal corresponding to a desired electrode position relative to the workpiece;
   measuring the actual electrode position and generating an actual position signal before the electrode reaches said workpiece;
   forming a position control difference signal as a function of the difference between said rated position signal and said actual position signal;
   conveying the electrode controlled by said position control difference signal toward said workpiece;
   measuring the actual pressure between the workpiece and the electrode and generating a corresponding actual pressure signal;
   providing a rated pressure signal according to a desired value of said pressure;
   forming a pressure control difference signal as a function of the difference between said actual pressure signal and said rated pressure signal; and
   conveying the electrode controlled by said pressure control difference signal on the workpiece, after said actual position signal reaches said rated position signal at least to a predetermined amount.

2. A conveyor apparatus for conveying at least one welding or soldering electrode toward a workpiece comprising:
   drive means for positioning said electrode, said drive means having a control input;
   position measuring means for measuring the actual electrode position and for generating an actual electrode position signal at an output thereof before said electrode reaches said workpiece;

presetting means for generating a rated electrode position signal at an output thereof;

difference forming means, the inputs of said difference forming means being coupled to the outputs of said position measuring means and of said presetting means, the output of said difference forming means being coupled to said control input of said drive means; and a pressure measuring means for measuring the actual reaction pressure between said workpiece and said electrode, said pressure measuring means forming a pressure control difference signal as a function of the difference between said actual pressure signal and a rated pressure signal to convey the electrode controlled by said pressure controlled difference signal on the workpiece after said actual position signal reaches said rated position signal at least to a pre-determined amount.

3. A conveyor apparatus according to claim 2, wherein said pressure measuring means comprises an elastic member with a known pressure to contraction ratio and a contraction measuring means to measure the contraction of said elastic member due to said reaction pressure of said workpiece up on said electrode; a threshold level sensitive means being coupled to the output of said difference forming means and generating a signal when a signal at the output of said difference forming means reaches the threshold level of said threshold level sensitive means; switching means being controlled by said signal generated by said threshold level sensitive means and switching the output of said pressure measuring means to an input of said difference forming means.

4. a conveyor apparatus according to claim 2, wherein said position measuring means comprises a potentiometer with the tap thereof being mechanically coupled to said electrode.

5. a conveyor apparatus according to claim 2, further comprising a threshold level sensitive means being coupled to the output of said difference forming means and for generating a control signal when a signal at the output of said difference forming means reaches the threshold level of said threshold level sensitive means, said control signal controlling said drive means to draw said electrode back into a rest position, spaced from said workpiece.

6. A conveyor apparatus according to claim 5, further comprising a position detector means to detect the presence of said electrode at said rest position and then for generating a further control signal, said control signal of said threshold level sensitive means disabling the rated electrode position signal of said presetting means to act on said difference forming means and said further control signal enabling said rated electrode position signal to act on said difference forming means.

7. A conveyor apparatus according to claim 5, wherein said threshold level sensitive means comprises a time delay means for generating a control signal as soon as the signal at the output of said difference forming means reaches said threshold level, said time delay means generating said control signal responsive to said signal at the output of said difference forming means and delayed by a delay time of said time delay means.

8. A conveyor apparatus according to claim 2, wherein at least the presetting means and the difference forming means are assembled to a module, mechanical guidings and electrical plug-connections being provided to insert said module and connect it to at least said drive means and said position measuring means.

9. A conveyor apparatus according to claim 8, further comprising further mechanical guidings and electrical plug-connections for accessories such as a microscope, a lamp, and a crossbar table for said workpiece.

10. A conveyor apparatus according to claim 2, further comprising a electronic controller to optimize step response of the electrode drive due to a step like rated electrode position signal so as to permit the electrode to softly and without overshooting reach the position according to said rated electrode position signal.

11. A conveyor apparatus according to claim 2, wherein the drive means comprises a projecting drive member to which the electrode is slidably mounted by means of an electrode carrier member, said pressure measuring means being mounted between said drive member and said electrode carrier member to preclude bending effects of said drive member from influencing said pressure measuring means.

12. A conveyor apparatus according to claim 2, further comprising double electrodes for cap-welding, each of said double electrodes being displaceable independently from the other, said pressure measuring means comprising a pressure detector for each one of said double electrodes.

* * * * *